United States Patent [19]
Bontrager et al.

[11] Patent Number: 5,769,485
[45] Date of Patent: Jun. 23, 1998

[54] TOP LIFT SYSTEM FOR POP-UP CAMPERS

[75] Inventors: Wilbur L. Bontrager, Middlebury; Wayne W. Miller, Goshen; Levi E. Schmucker, Syracuse; Larry W. Jones, Ligonier, all of Ind.

[73] Assignee: Jayco, Inc., Middlebury, Ind.

[21] Appl. No.: 692,058

[22] Filed: Aug. 2, 1996

[51] Int. Cl.⁶ ................................................... B60P 3/355
[52] U.S. Cl. ............................ 296/171; 296/27; 296/173
[58] Field of Search .................................... 296/171, 172, 296/173, 175, 176, 26, 27, 165; 74/502.6

[56] References Cited

U.S. PATENT DOCUMENTS

| | | | |
|---|---|---|---|
| 3,506,300 | 4/1970 | Remmert | 296/23 |
| 3,507,535 | 4/1970 | Wallace | 296/23 |
| 3,528,698 | 9/1970 | Miller | 296/27 |
| 3,885,826 | 5/1975 | Kropf | 296/23 R |
| 3,972,544 | 8/1976 | Soot | 280/704 |
| 3,981,529 | 9/1976 | Bontrager | 296/23 |
| 4,171,843 | 10/1979 | Steury | 296/27 |
| 4,738,155 | 4/1988 | Stocker | 74/501 P |
| 5,246,303 | 9/1993 | Trilla et al. | 403/353 |
| 5,295,408 | 3/1994 | Nagle et al. | 74/502.6 |
| 5,570,611 | 11/1996 | Pospisil et al. | 74/502.6 |

*Primary Examiner*—Dean Kramer
*Attorney, Agent, or Firm*—Baker & Daniels

[57] ABSTRACT

An improved lift mechanism for raising and lowering the tops of pop-up tent campers and similar vehicles. The mechanism of the present invention is used to simultaneously raise or lower a pair of telescoping support posts that connect the extendable top to the body, and includes a pair of guide housings that connect to the telescoping posts. A pair of substantially incompressible flexible springs is slidably disposed within the guide housings, and a drive cable extends between the guide housings and connects the flexible springs so that movement of one of the springs produces a simultaneous movement of the other spring. A block housing having an internal pulley is attached to each end of the guide housings, so that a single drive cable can be used to activate both of the flexible springs at once.

14 Claims, 7 Drawing Sheets

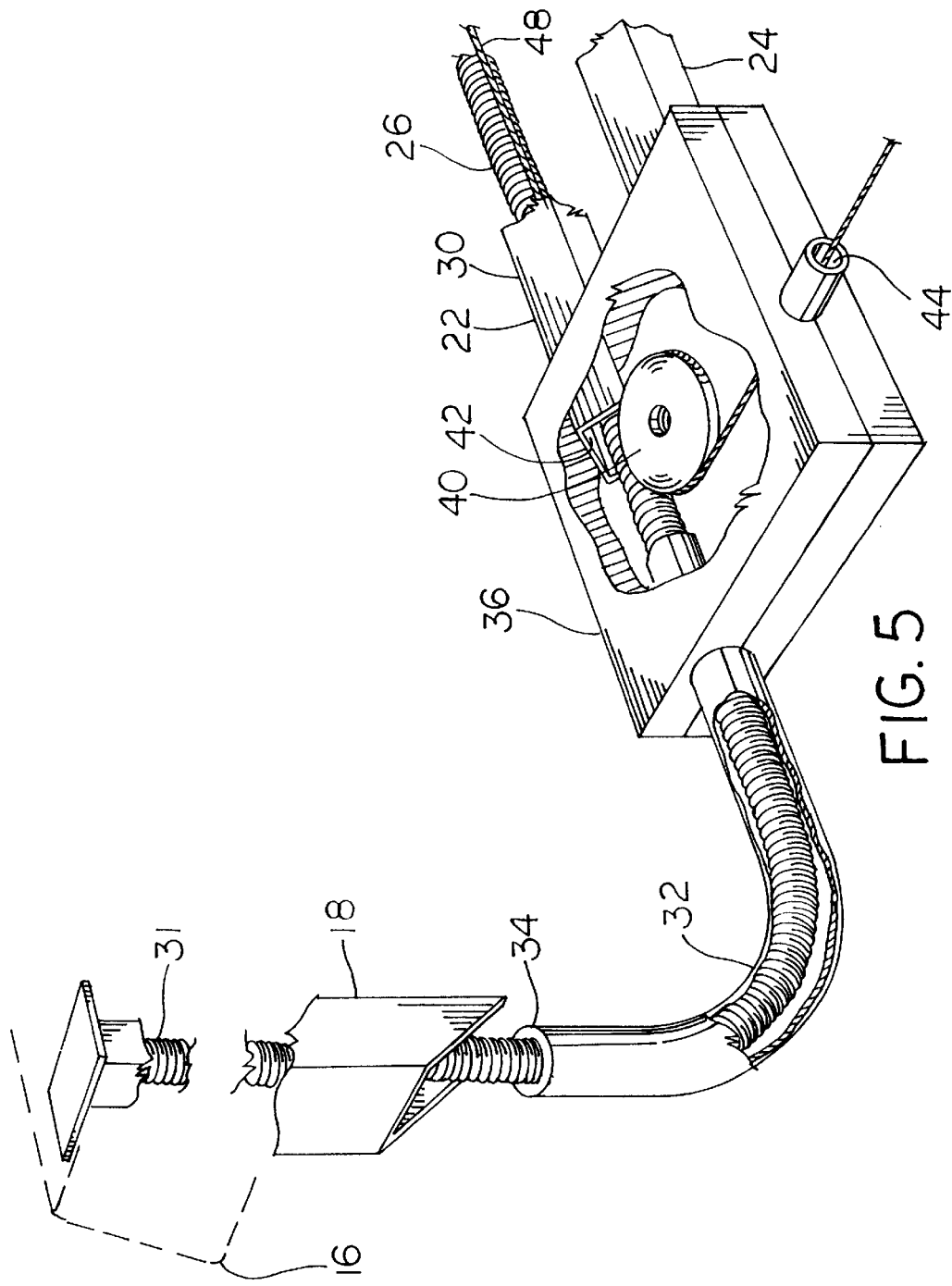

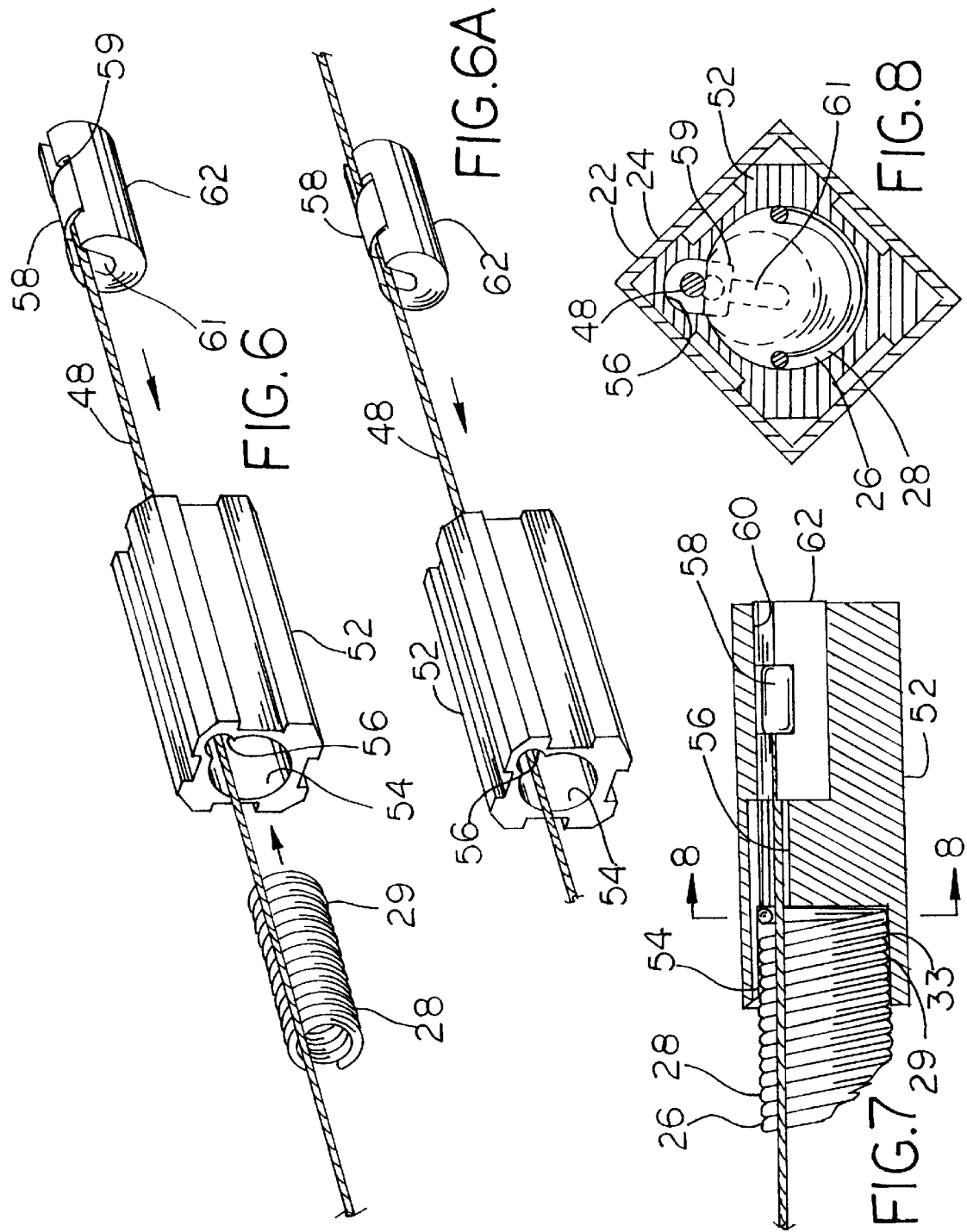

TOP LIFT SYSTEM FOR POP-UP CAMPERS

The present invention relates to a device for raising and lowering the roof on vehicles such as towable tent campers, pop-up campers, and other recreational vehicles.

BACKGROUND OF THE INVENTION

Towable tent campers and pop-up trailers having collapsible roofs are generally well known in the art. Despite the widespread popularity of large recreational vehicles such as motorhomes and fifth wheel trailers, many consumers prefer the relative simplicity, low cost, and ease of operation and maintenance of the smaller and less expensive towable pop-up trailers and tent campers. These trailers are very easy to tow because of their light weight, and because the top folds down to a collapsed, compact state, the trailer has a low aerodynamic profile and can therefore be towed by smaller and lighter cars and trucks. These smaller trailers are also much easier to maneuver in tight areas compared to larger recreational vehicles, which also adds to their appeal.

The prior art mechanisms used for raising and lowering the collapsible tops on these vehicles are generally balky, hard to operate and maintain, and prone to failure. For example, many of the lifting mechanisms rely on cranks and cables that are exposed to the elements, and which accumulate dirt and debris. On the other hand, some manufacturers use more reliable gear driven devices, but these devices are significantly heavier, more expensive to produce, and more difficult to install.

One prior art design is disclosed in U.S. Pat. No. 3,495,866, and uses one or more telescoping support posts that are typically positioned at the four corners of the top and driven by a common crank or other lift mechanism. Although this design provides an improved support post, it still relies on the troublesome prior art lift mechanism, and hence suffers from the same problems discussed above. Accordingly, manufacturers of pop-up towable trailers require a top lifting mechanism that is not only reliable, lightweight, and easy to operate, but that is also easy to produce, install, and maintain.

SUMMARY OF THE INVENTION

The improved top lifting mechanism of the present invention is easier and less costly to produce and install than prior art designs, is lightweight, easy to operate and maintain, and also is very reliable when used in conjunction with the prior art telescoping support post. The preferred embodiment of the present invention utilizes a telescoping support post that is lifted by a flexible lifting member disposed within a system of guide conduits or housings. The lifting member is activated by a block and cable assembly having an internal pulley. The flexible member abuts the telescoping support post. Upon actuation of a hand driven crank, a cable draws one end of the flexible member through the guide conduit or housing and forces the other end of the member against the support post thereby extending the support post and raising the top of the vehicle.

The flexible lifting member must be stiff enough to withstand a compressive force and yet flexible enough to slide through the guide housing, which bends upward around a smooth corner, so that the lifting member can contact the telescoping support post and force the post upward. Although a variety of plastic or composite materials may be used, the preferred embodiment utilizes a tightly wound spring which, when laterally constrained by the guide housing, allows the member to withstand a compressive force and further allows the member to negotiate the smooth corner. When the top of the vehicle is down, the flexible lifting member is disposed in a substantially horizontal position within one of the horizontal guide conduits or housings. When the top is raised, the member slides through the horizontal housing and passes through the block assembly. A second guide housing, which bends upwardly, guides the member into contact with the support post. Because the lifting member is substantially horizontal when the top is down, the entire lifting mechanism takes up less vertical space, which allows for a more compact and aerodynamic trailer. The flexible lifting member, the guide housings, the block and cable assembly, and the crank assembly are all sealed against the elements, which greatly improves reliability.

Accordingly, it is an object of this invention to provide an improved top lifting mechanism for towable pop-up campers and travel trailers that is easier to operate and maintain.

It is another object of this invention to provide an improved top lifting mechanism for towable pop-up campers and travel trailers that is lighter and takes up less vertical space.

A further object of this invention is to provide an improved top lifting mechanism for towable pop-up campers and travel trailers that is sealed against the elements.

Other objects of the invention will become readily apparent to those skilled in the art upon a reading of the following description.

BRIEF DESCRIPTION OF THE DRAWINGS

FIG. 5 is a fragmentary perspective view, partly in section, of a detail of the top lift system shown in FIGS. 2 through 4;

FIG. 6 is a fragmentary exploded view in perspective of the flexible member, the cable anchor, and the sliding plug assembly used to force the flexible member back and forth through the hollow housings;

FIG. 6A is a fragmentary exploded view in perspective of the flexible member, cable anchor, and sliding plug assembly similar to that shown in FIG. 6, but with the cable continuing past the plug assembly;

FIG. 7 is a fragmentary elevational view, partly in section, of the flexible member, the cable anchor, and the sliding plug assembly shown in FIG. 6; and FIG. 8 is a cross-sectional view of the flexible member, the cable anchor, and the sliding plug assembly taken along line 8—8 of FIG. 7.

DETAILED DESCRIPTION OF THE INVENTION

The embodiment herein described is not intended to be exhaustive or to limit the invention to the precise form disclosed. It is chosen and described to explain the principles of the invention and its application and practical use to best enable others skilled in the art to follow its teachings.

Figure 1:
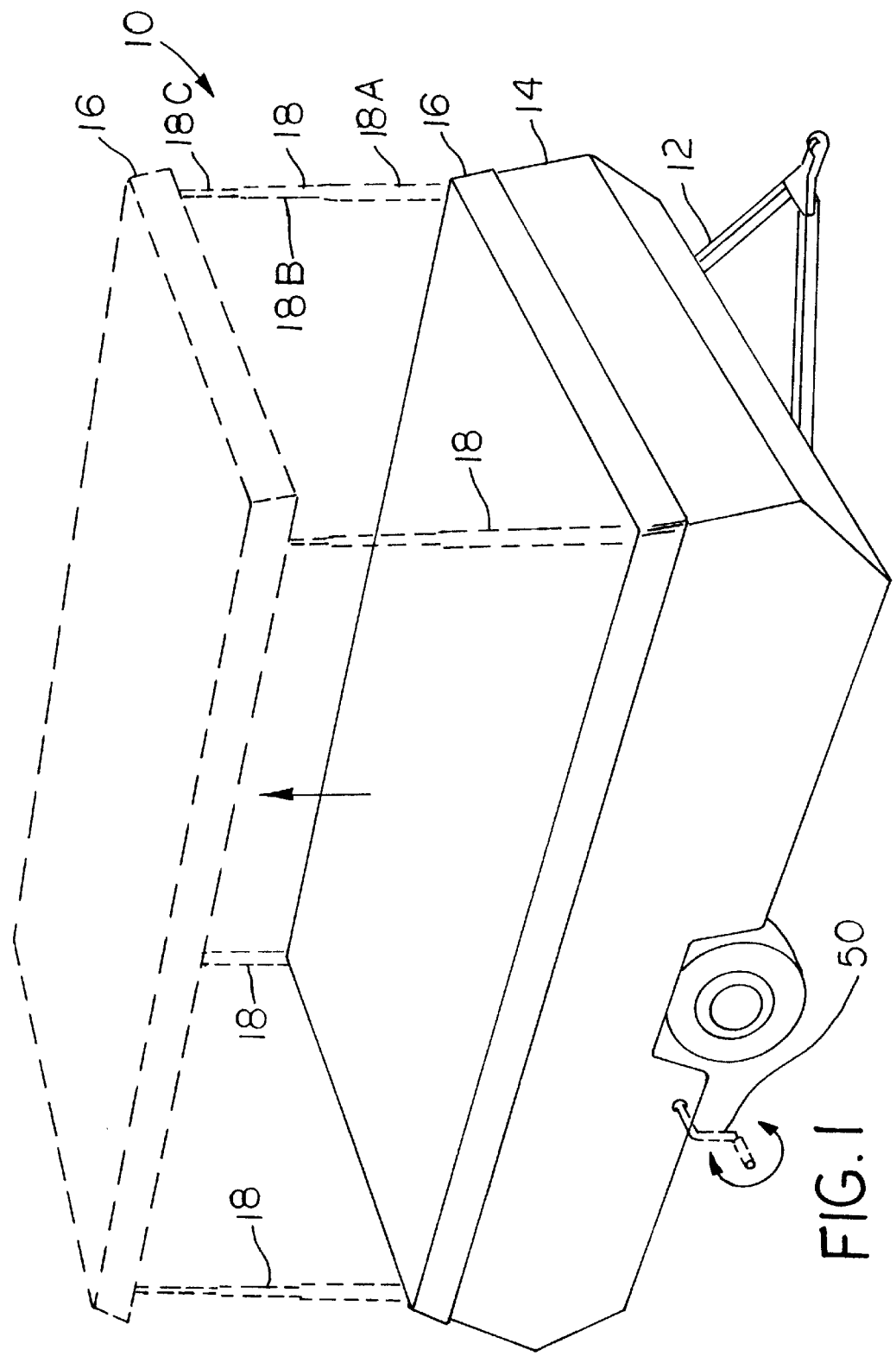
FIG. 1 is a perspective view of a conventional pop-up trailer having a collapsible top supported by four telescoping support posts.
Figure 2:
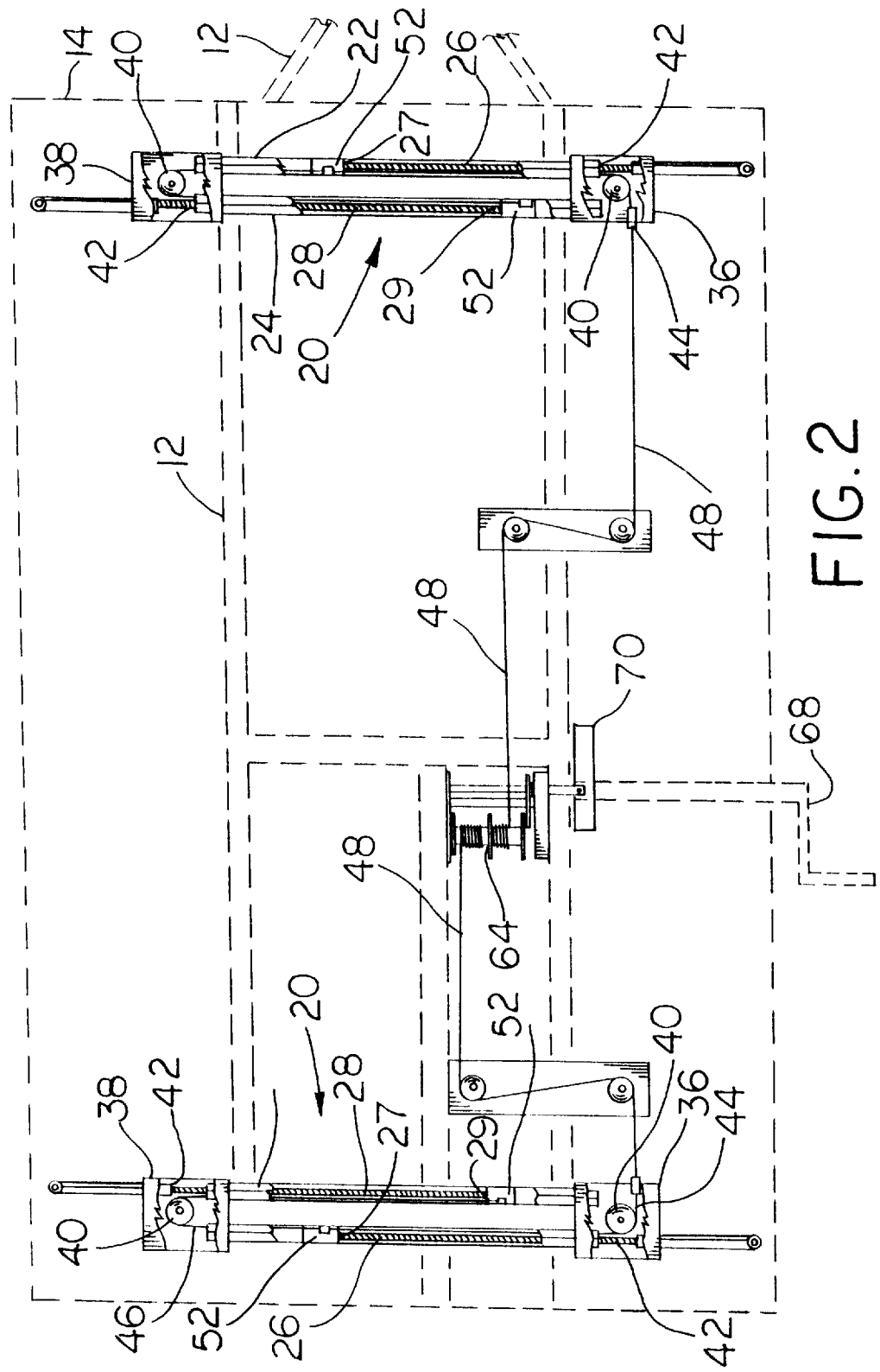
FIG. 2 is a fragmentary top plan view of the top lift system of the present invention shown attached to the frame of the pop-up trailer shown in FIG. 1.
Figure 3:
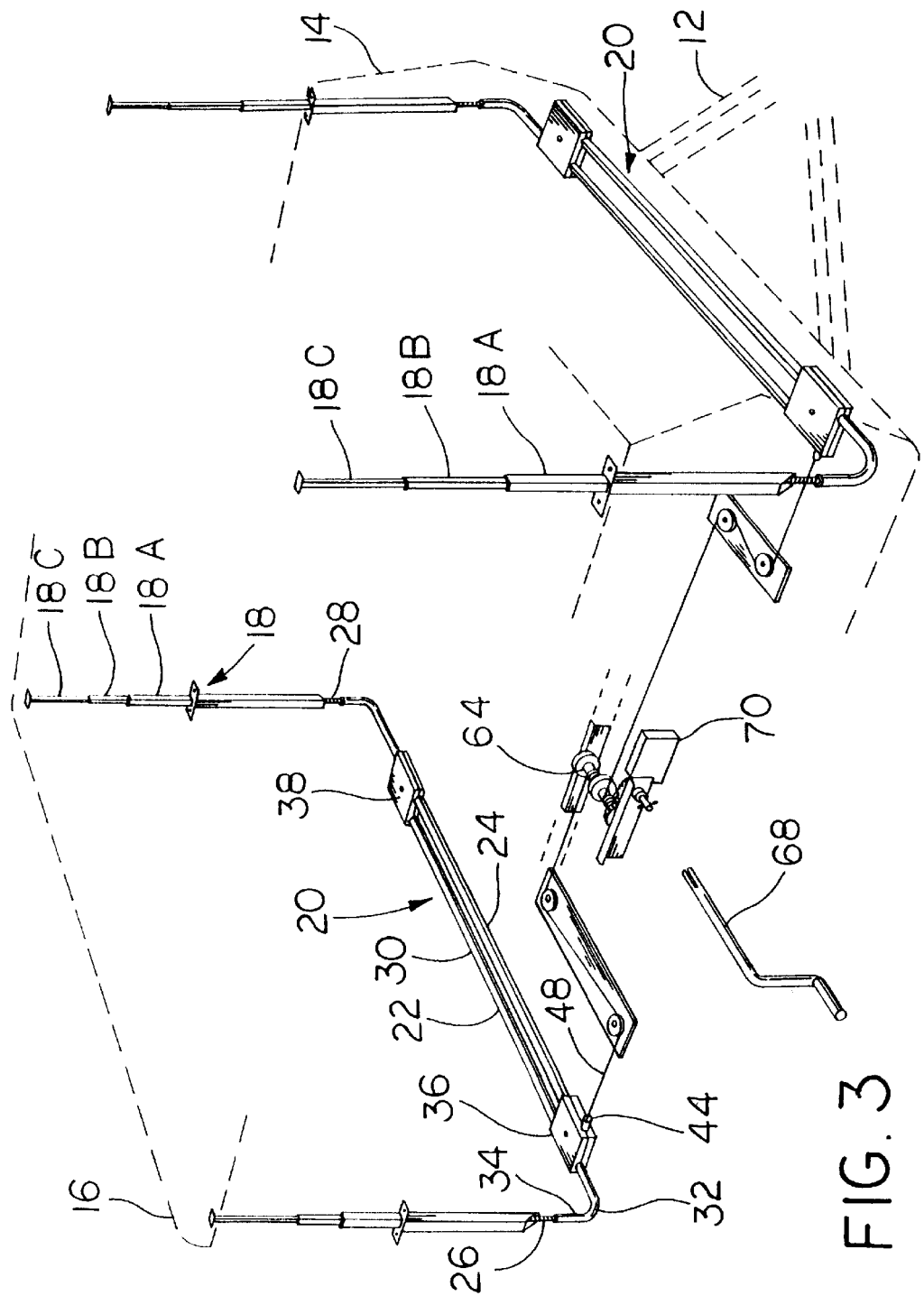
FIG. 3 is fragmentary perspective view of the top lift system shown in FIG. 2.
Figure 4:
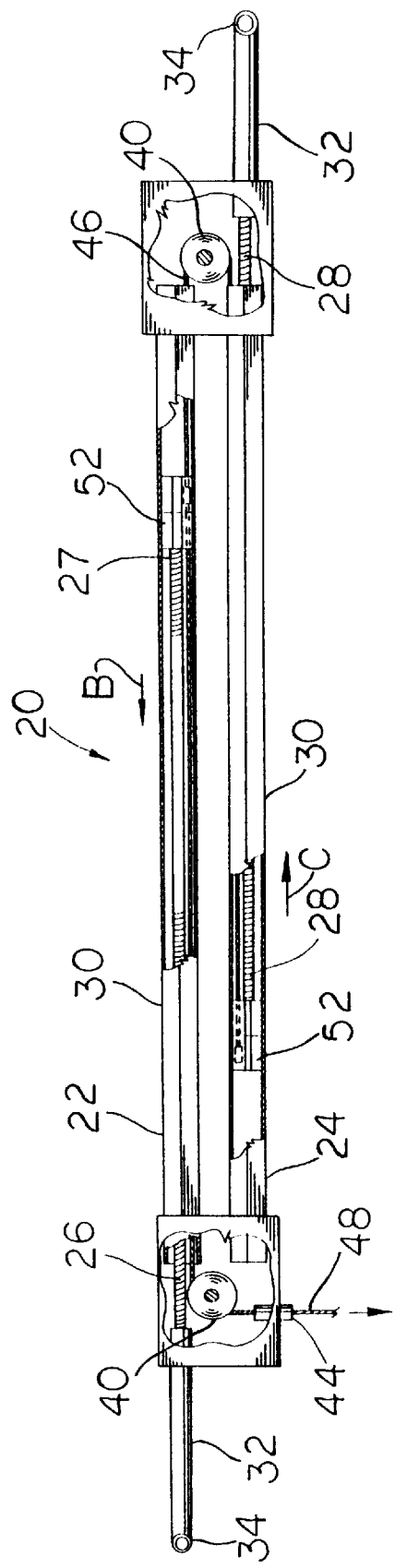
FIG. 4 is a fragmentary top plan view, partly in section, of the top lift system shown in FIGS. 2 and 3.
Figure 5A:
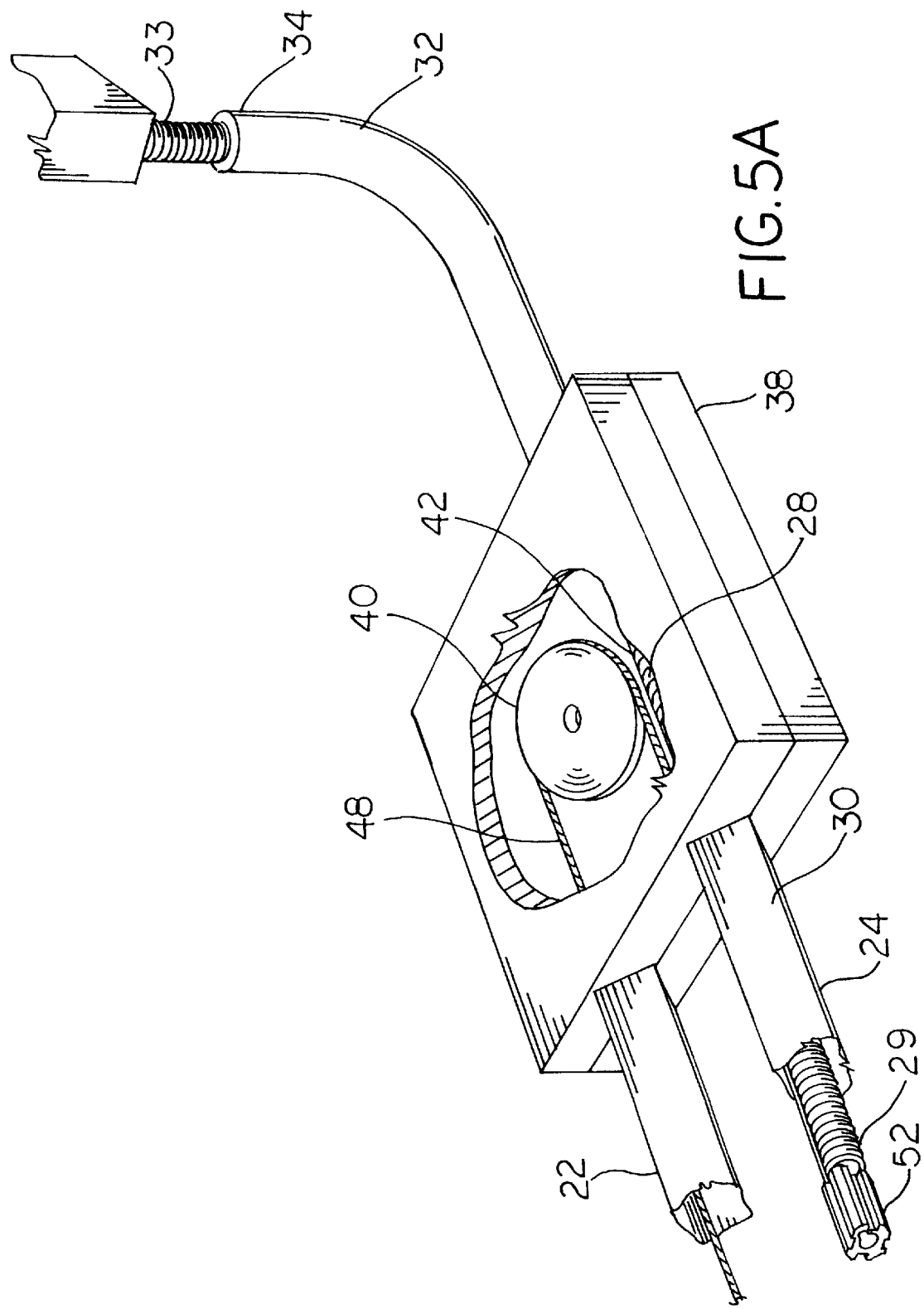
FIG. 5A is a fragmentary perspective view, partly in section, similar to that shown in FIG. 5 but taken at the other end of the top lift system.

Referring now to the drawings, a pop-up tent camper having the lift mechanism of the present invention is generally referred to by the reference numeral 10. Camper 10 includes frame 12, body 14 and collapsible top 16. Top 16 is connected to body 14 at each corner by telescoping support posts 18. Each telescoping support post 18 has a number of aligned, telescopically extending segments 18A, 18B, 18C, as is known in the industry, and shifts between an extended position (in which top 16 is raised as illustrated in FIG. 3 or by the dotted lines in FIG. 1), and a retracted position (in which top 16 is lowered as illustrated by the solid lines in FIG. 1). As shown in FIGS. 3, 4 and 5, at least one lift mechanism 20 is attached to frame 12 of camper 10 by screws, bolts, brackets or other conventional methods. Each lift mechanism 20 raises and lowers a corresponding pair of telescoping support posts 18. Each lift mechanism 20 includes guide housings 22, 24, each of which houses and contains flexible springs 26, 28, respectively. Guide housings 22, 24 each include horizontal portion 30, arcuate or curved portion 32, and vertical portion 34. Spring 26 includes first end 27, which lies within horizontal portion 30 of guide housing 22, and further includes second end 31, which lies within vertical portion 34 of guide housing 22. Similarly, spring 28 includes first end 29, which lies within horizontal portion 30 of guide housing 24, and also includes second end 33, which lies within vertical portion 34 of guide housing 24. Telescoping support posts 18 are mounted on each vertical portion 34 of each guide housing 22, 24, so as to permit ends 31, 33 of flexible springs 26, 28 to contact or abut a corresponding one of the telescoping support posts 18. Springs 26, 28 thus extend or retract telescoping support posts 18, thereby raising or lowering top 16 of camper 10, as will be discussed in greater detail below. As shown in FIGS. 4 through 8, flexible springs 26, 28 are slidably disposed within guide housings 22, 24, such that ends 27, 29 of springs 26, 28 lie within horizontal portion 30 of guide housings 22, 24, respectively. Ends 31, 33 of flexible springs 26, 28, respectively, are positioned in vertical portion 34 of guide housings 22, 24, so that ends 31, 33 are in abutting contact with the adjacent telescoping support post 18.

Each lift mechanism 20 further includes a pair of block housings 36, 38. Each block housing 36, 38 includes an internal pulley 40, and further includes a spring passage 42 sized to allow springs 26, 28 to slide back and forth within guide housings 22, 24, passing through block housings 36, 38. Block housing 36 includes drive cable passage 44, while block housing 38 includes drive cable passage 46. Drive cable 48 is connected to a rotatable shaft, windlass, or spool 64 and passes through cable passage 44 of block housing 36, over pulley 40, through horizontal portion 30 of guide housing 22 adjacent flexible spring 26, into cable passage 46 of block housing 38, and into guide housing 24 adjacent flexible spring 28.

As shown in FIGS. 6, 7 and 8 drive cable 48 is attached to ends 27, 29 of flexible springs 26, 28, by anchor bushing 52, and fits within guide housings 22, 24 next to springs 26, 28. Anchor bushing 52 is sized to slide back and forth within horizontal portion 30 of guide housings 22, 24, and anchor bushing 52 includes circular seat 54, which is sized to receive ends 27, 29 of flexible springs 26, 28. Anchor bushing 52 further includes passage or bore 56 which passes through bushing 52, to permit drive cable 48 to either terminate at bushing 52, as shown in FIG. 6, or pass through anchor bushing 52, as shown in FIG. 6A. As can be seen in FIGS. 4, 6, and 6A, bushing 52 anchors drive cable 48 to end 27 of spring 26, yet drive cable 48 contains past end 27, through block housing 38. Drive cable 48 is anchored to bushing 52 at end 29 of spring 28. At each bushing 52, clip 58 is attached to drive cable 48, and is larger than bore 56 through bushing 52, so that clip 58 will not pass through bore 56, thereby anchoring drive cable 48 to bushing 52. Preferably bore 56 of bushing 52 includes a counterbore 60 on the end opposite seat 54. Clip 58 is secured within cylindrical plug 62, which is sized to fit within counterbore 60. Cylindrical plug 62 includes a notch 59 sized to accommodate clip 58, and further includes slot 61, sized to accommodate drive cable 48. One end of drive cable 48 is attached to a windlass or spool 64 in a conventional manner, and crank 68 is used rotate spool 64, thus winding drive cable 48 onto spool 64. Typically, hand operated crank 68 is used to wind drive cable 48 onto spool 64, but in the alternative motor drive unit 70 may be employed to achieve the same result. Motor drive unit 70 may be battery operated or connected to the electrical system of a towing vehicle (not shown).

In operation, the camper 10 is usually towed to a camp site by a towing vehicle (not shown). In order to raise top 16 from body 14, the operator uses either crank 68 or motor drive unit 70 to wind drive cable 48 onto spool 64, which draws drive cable 48 in the direction indicated by arrow A in FIG. 4. In the process, the connection between drive cable 48 and bushing 52 at end 27 of flexible spring 26 causes end 27 to move in the direction indicated by arrow B. Simultaneously, the connection between drive cable 48 and bushing 52 at end 29 of flexible spring 28 causes end 29 to move in the direction indicated by arrow C. The movement of springs 26, 28 through housings 22, 24 forces ends 31, 33 upwardly through vertical portion 34 of the housings, and into contact with telescoping support posts 18, which in turn extends the support posts and raises the top 16 away from the body 14. To lower the top, the rotation of crank 68 is reversed so that drive cable 48 gradually unwinds from spool 64, and the weight of the top allows the top to return to its original, lowered position.

It should be understood that the above description does not limit the invention to the form disclosed, but may be modified within the scope of the following claims.

What is claimed:

1. On a vehicle having a top portion, a body portion, and a pair of telescoping support posts connecting the top portion to the body portion, a lift mechanism for simultaneously extending or retracting the telescoping support posts to thereby raise the top portion to a raised position above the body portion or lower the top portion to a lowered position on the body portion, said lift mechanism comprising:

a pair of guide housings, one of said guide housings extending from each of said support posts;

a block housing mounted to the ends of said pair of guide housings, each of said block housings including an internal pulley, each of said block housings further including one or more passages extending through said block housings substantially tangential to its said pulley, a pair of substantially incompressible flexible members, each of said flexible members being slidably mounted in one of said guide housings and attached to a corresponding support post for raising and lowering the latter;

a continuous drive cable, said drive cable extending between said guide housings and connecting one of said flexible members with the other flexible member whereby movement of said one flexible member is transmitted to the other flexible member for movement of the latter, said drive cable passing through both of said block housings; and drive means for moving said drive cable.

2. The mechanism of claim 1, wherein said drive means includes a hand operated crank.

3. The mechanism of claim 1, wherein said drive means is motor operated.

4. The mechanism of claim 1, wherein said drive cable is wound upon a windlass.

5. The mechanism of claim 1, wherein one end of each of said flexible members is mounted to a bushing, said bushing being slidably disposed within said guide housings, each of said bushings being attached to said drive cable.

6. The mechanism of claim 5, wherein each of said bushings includes a seat sized to receive said one end of said flexible members.

7. The mechanism of claim 6, wherein each of said bushings includes a bore, and wherein said drive cable passes through said bore.

8. The mechanism of claim 7, wherein each of said bushings is attached to said drive cable by a clip, said clip being frictionally attached to said drive cable, said clip thereby preventing said drive cable from sliding through said bore.

9. The mechanism of claim 8, wherein said bore in said bushing further includes a counterbore, said counterbore being disposed on the end of said bushing opposite said seat, and wherein said clip is sized to fit within said counterbore.

10. The mechanism of claim 8, wherein said clip includes a cylindrical plug.

11. The mechanism of claim 1, wherein said flexible members are tight wound coil springs.

12. The mechanism of claim 1, wherein said pair of guide housings are attached to the body portion, each of said housings being substantially parallel to each other.

13. The mechanism of claim 1, wherein said drive cable passes through each of said block housings and over its said pulley.

14. On a vehicle having a top portion, a body portion, and a pair of telescoping support posts connecting the top portion to the body portion, a lift mechanism for simultaneously extending or retracting the telescoping support posts to thereby raise the top portion to a raised position above the body portion or lower the top portion to a lowered position on the body portion, said lift mechanism comprising:

a pair of guide housings, each of said guide housings having a pair of ends, one of said guide housings extending from each of said support posts;

a pair of substantially incompressible flexible members, each of said flexible members being slidably mounted in one of said guide housings and attached to a corresponding support post for raising and lowering the latter; and drive means for driving said flexible members, said drive means extending between said guide housings and connecting one of said flexible members with the other flexible member whereby movement of said one flexible member is transmitted to the other flexible member for movement of the latter, said drive means including a block housing mounted to said ends of said guide housings each of said block housings including an internal pulley, said drive means further including a continuous drive cable extending internally through said guide housings and said block housings and connecting said flexible members.

\* \* \* \* \*